United States Patent
Ho et al.

(10) Patent No.: US 9,372,269 B2
(45) Date of Patent: Jun. 21, 2016

(54) SCINTILLATOR PANEL, RADIATION IMAGE SENSOR AND METHOD OF MAKING THE SAME

(71) Applicant: ARCHITEK MATERIAL CO., LTD., New Taipei (TW)

(72) Inventors: Shu-Lin Ho, Taoyuan County (TW); Pao-Yun Tang, Taoyuan County (TW)

(73) Assignee: ARCHITEK MATERIAL CO., LTD., Tucheng Dist., New Taipei (TW)

( * ) Notice: Subject to any disclaimer, the term of this patent is extended or adjusted under 35 U.S.C. 154(b) by 123 days.

(21) Appl. No.: 14/538,792

(22) Filed: Nov. 11, 2014

(65) Prior Publication Data

US 2015/0331117 A1    Nov. 19, 2015

(30) Foreign Application Priority Data

May 13, 2014    (TW) .............................. 103116879 A

(51) Int. Cl.
*G01T 1/20*    (2006.01)
(52) U.S. Cl.
CPC .................. *G01T 1/20* (2013.01); *G01T 1/2004* (2013.01); *G01T 1/2008* (2013.01)

(58) Field of Classification Search
CPC ........ G01T 1/20; G01T 1/2002; G01T 1/2008
See application file for complete search history.

(56) References Cited

U.S. PATENT DOCUMENTS

| | | | |
|---|---|---|---|
| 2002/0020846 A1* | 2/2002 | Pi ........................ | H01L 27/1462 257/88 |
| 2007/0040125 A1* | 2/2007 | Sato .................. | H01L 27/14663 250/367 |
| 2012/0121067 A1* | 5/2012 | Hayden .................. | G01T 1/2018 378/62 |
| 2013/0200266 A1* | 8/2013 | Perna .................... | G01T 1/2006 250/366 |
| 2014/0197510 A1* | 7/2014 | Ho .................... | H01L 31/02322 257/432 |

FOREIGN PATENT DOCUMENTS

JP    05060871 A    *    3/1993

* cited by examiner

*Primary Examiner* — Casey Bryant
(74) *Attorney, Agent, or Firm* — Winston Hsu; Scott Margo

(57) ABSTRACT

A scintillator panel includes a substrate having a front side and a rear side. A first scintillator layer is embedded into the front side of the substrate to a first depth. A second scintillator layer is embedded into the rear side of the substrate to a second depth.

12 Claims, 5 Drawing Sheets

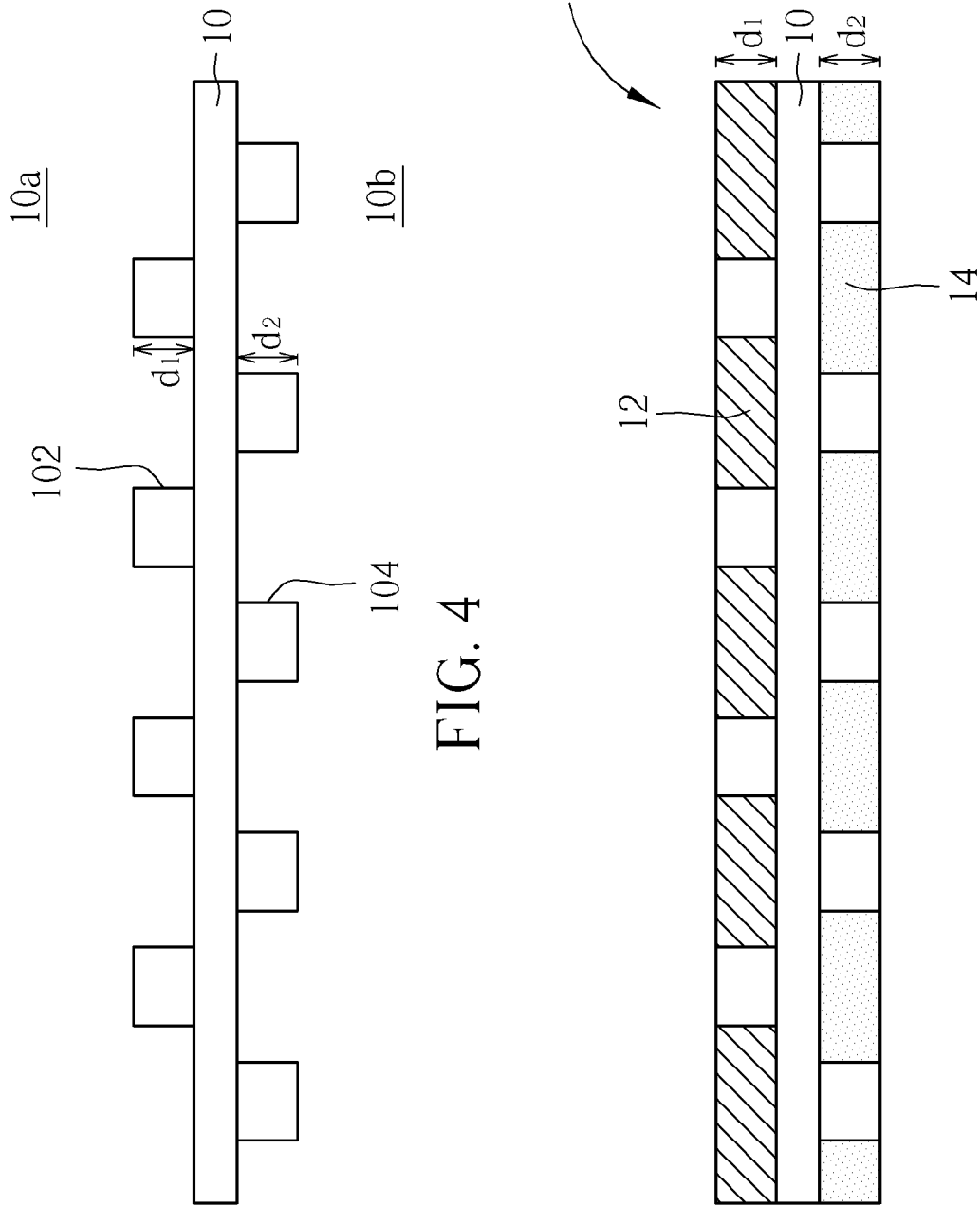

SCINTILLATOR PANEL, RADIATION IMAGE SENSOR AND METHOD OF MAKING THE SAME

CROSS REFERENCE TO RELATED APPLICATION

This application claims the benefit of Taiwan patent application No. 103116879, filed on May 13, 2014, the disclosure of which is incorporated herein in its entirety by reference.

BACKGROUND OF THE INVENTION

1. Field of the Invention

The present invention relates to the technical field of radiation imaging, in particular, relates to an innovative scintillator panel and a radiation image sensor device using the scintillator panel, which is capable of overlapping images of multiple energy levels, to thereby achieve higher resolution and improved recognition of symptoms.

2. Description of the Prior Art

With advances in medical technology, many diseases can get quick and accurate diagnosis through X-ray medical imaging or radioactive scanning techniques, such as chest X-rays, bone X-rays, dental X-rays, X-rays of the breast, or computed tomography (CT), and so on. However, the modern therefore receive a higher radiation dose than in the past. Therefore, the researchers have been striving to reduce the radiation dose absorbed and potential radiation damage without compromising the imaging quality.

Generally, medical X-ray imaging apparatus comprises an X-ray tube and a radiation image sensor. U.S. Patent Publication No. 2004/0211918A1 discloses a radiation imaging apparatus including a scintillator panel and an imaging device. The scintillator panel is composed of an aluminum substrate and thallium-doped cesium iodide (CsI: Tl) layer in columnar crystalline form. Prior to the formation of the CsI: Tl scintillator layer, the surface of the aluminum substrate is coated with a magnesium fluoride (MgF2) layer. To avoid deliquescence of thallium-doped cesium iodide, the aluminum substrate has to be completely encapsulated by using a polymer film.

However, these previous techniques still have many shortcomings. For example, the manufacturing process is complicated and expensive, and thallium used in the manufacturing process is highly toxic. Therefore, sophisticated gas filtration systems are required to avoid environmental pollution. Further, limited by the material properties, thallium is not uniformly doped in the cesium iodide, but can only be doped in a shallow layer, resulting in poor light conversion efficiency. That means a higher energy X-ray exposure is usually needed. Moreover, in order to achieve the desired luminous efficiency, the thickness of the columnar crystalline CsI: Tl has to be 600 microns or more. In addition, due to its hydrolysis characteristics, CsI: Tl is easily influenced by moisture, and therefore storage of CsI: Tl becomes a problem.

Typically, scintillator is composed of a single material. For different X-ray energy levels, only one certain quantum efficiency and only one certain conversion efficiency are obtained. Only the image of certain energy level can be converted from X-ray energy that penetrates through the human body or an object. However, such image data is not adequate to diagnose the lesions. Therefore, radiation imaging with higher doses is required, such as computed tomography or 3D image reconstruction. This results in increased radiation dose, harmful to human health. In light of the above, the industry still needs a novel radiation imaging device and scintillator panels to solve the above shortcomings.

SUMMARY OF THE INVENTION

It is one object of the invention to provide an improved scintillator panel and radiation image sensor device, which is capable of implementing image overlapping with multiple quantum efficiencies and conversion efficiencies, thereby achieving higher resolution and improved recognition of symptoms, thereby reducing the times required for the radiation exposure and the absorption effect of radiation dose.

It is another object of the invention to provide an improved method of making the scintillator panel and radiation image sensor device, which is not complicated, non-toxic, and environment friendly.

To these ends, a scintillator panel includes a substrate having a front side and a rear side. A first scintillator layer is embedded into the front side of the substrate to a first depth. A second scintillator layer is embedded into the rear side of the substrate to a second depth.

According to one embodiment, a radiation image sensor device comprises the above-described scintillator panel, and an image sensor coupled to the scintillator panel. The image sensor may comprise a thin-film transistor (TFT) with P type-intrinsic-N type (PIN) diode, a charge-coupling diode (CCD), or a CMOS image sensor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings:

FIGS. 4 and 5 show an exemplary method of making the scintillator panel according to one embodiment of the invention.

DETAILED DESCRIPTION

The present invention has been particularly shown and described with respect to certain embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

Figure 1C:
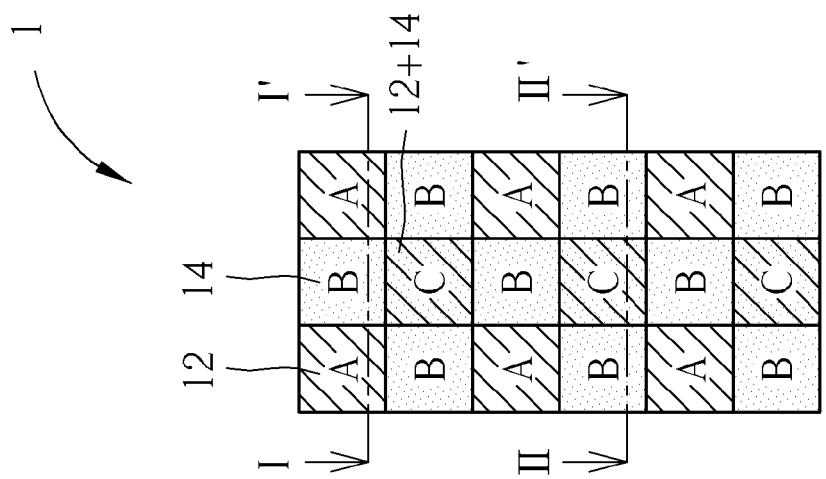
FIG. 1C is a perspective view of the scintillator panel showing overlapping image of the layouts in FIGS. 1A and 1B.
Figure 1B:
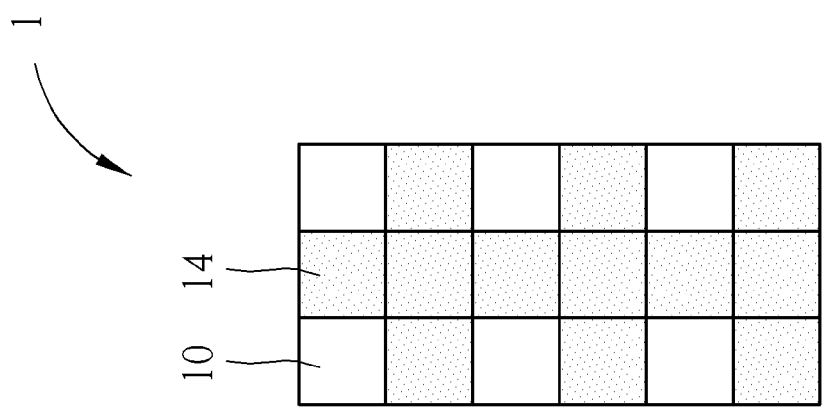
FIG. 1B is a schematic top view showing the layout on a back side of the scintillator panel according to one embodiment of the invention.
Figure 1A:
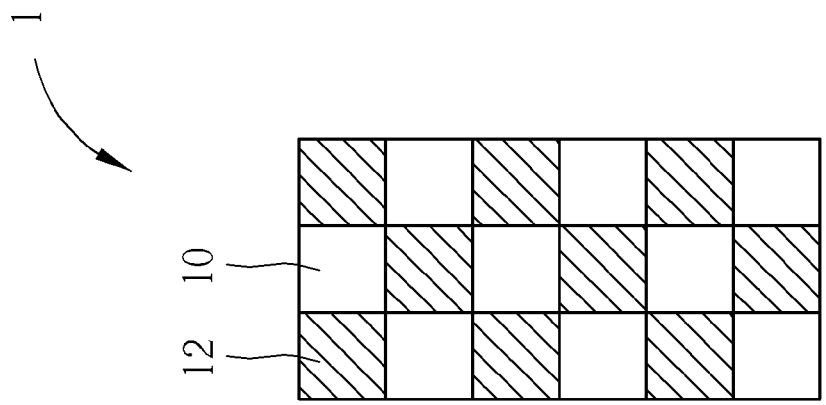
FIG. 1A is a schematic top view showing the layout on a front side of a scintillator panel according to one embodiment of the invention.
Figure 2A:
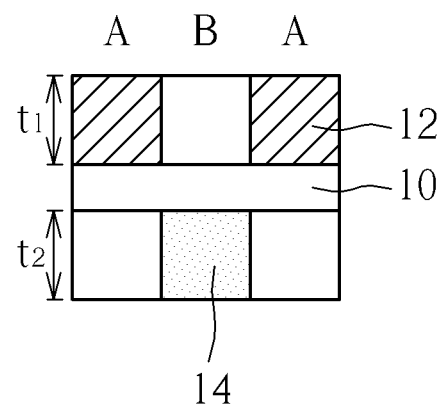
FIG. 2A is a schematic, cross-sectional diagram taken along line I-I' in FIG. 1C.
Figure 2B:
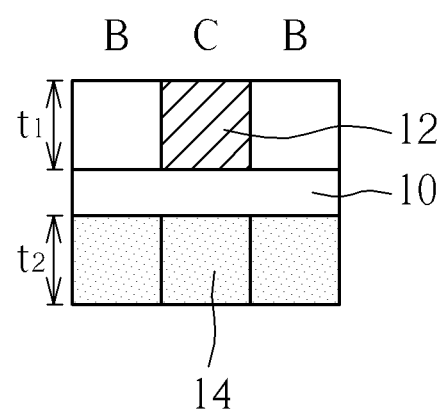
FIG. 2B is a schematic, cross-sectional diagram taken along line II-II' in FIG. 1C.

Please refer to FIG. 1A to FIG. 1C, and FIG. 2A and FIG. 2B. FIG. 1A is a schematic top view showing the layout on a front side of a scintillator panel according to one embodiment of the invention. FIG. 1B is a schematic top view showing the layout on a back side of the scintillator panel in FIG. 1A according to one embodiment of the invention. FIG. 1C is a perspective view of the scintillator panel showing overlapping image of the layouts in FIGS. 1A and 1B. FIG. 2A is a schematic, cross-sectional diagram taken along line I-I' in FIG. 1C. FIG. 2B is a schematic, cross-sectional diagram taken along line II-II' in FIG. 1C. The figures only show a portion of the scintillator panel.

According to one embodiment of the invention, as shown in FIG. 1A and FIG. 1B, the scintillator panel 1 of the invention includes a substrate 10 having thereon a first scintillator layer 12 with chessboard-like pattern that is buried or embedded into a predetermined depth of the substrate 10. According to the embodiment of the invention, the first scintillator layer 12 does not extend through the entire thickness of the substrate 10. According to the embodiment of the invention, the first scintillator layer 12 has a top surface that is flush with the main surface of the substrate 10.

According to the embodiment of the invention, on the backside of the substrate 10, a fishbone-like (or grid type) second scintillator layer 14 is arranged. Likewise, the second scintillator layer 14 is buried or embedded into a predetermined depth of the substrate 10. According to the embodiment of the invention, the second scintillator layer 14 does not extend through the entire thickness of the substrate 10. According to the embodiment of the invention, the second scintillator layer 14 has a top surface that is flush with the main surface on the backside of the substrate 10. According to the embodiment of the invention, the second scintillator layer 14 is not in direct contact with the first scintillator layer 12.

As shown in FIGS. 1C, 2A, and 2B, and can be best seen in FIG. 1C, the chessboard-like first scintillator layer 12 on the front side of the substrate 10 and the fishbone-like second scintillator layer 14 on the back side of the substrate 10 overlap with each other to form three regions A, B and C arranged in an array that is similar to a chessboard. The three regions A, B and C have different equivalent thicknesses of scintillator.

According to the embodiment of the invention, the equivalent thickness of scintillator in the region A is determined by the thickness t1 of the first scintillator layer 12 on the front side of the substrate 10. According to the embodiment of the invention, the equivalent thickness of scintillator in the region B is determined by the thickness t2 of the second scintillator layer 14 on the back side of the substrate 10. According to the embodiment of the invention, the equivalent thickness of scintillator in the region C is determined by the combination of the thickness t1 of the first scintillator layer 12 and the thickness t2 of the second scintillator layer 14 (t1+t2).

It is to be understood by those skilled in the art that the layout or pattern shown in figures is only for illustration purposes. It is understood that other layouts or patterns may be used on the front side or back side of the substrate 10 in other embodiments.

According to the embodiment of the invention, the substrate is a visible-light transparent substrate. For example, the substrate 10 may include, but is not limited to, polymeric substrates, plastic substrates, glass substrates, quartz or quartz glass. The aforesaid polymeric substrates may include, but is not limited to, polyimide (PI), polyethylene terephthalate (PET), polycarbonate (PC), polystyrene (PS), or polymethyl methacrylate (PMMA).

According to the embodiment of the invention, the thickness t1 of the first scintillator layer 12 is different from the thickness t2 of the second scintillator layer 14. For example, the thickness t1 of the first scintillator layer 12 is smaller than the thickness t2 of the second scintillator layer 14 such that the region A in FIG. 1C has a scintillator thickness that is smaller than that of the region B, while the region C has the thickest total scintillator thickness.

However, it is to be understood that that the thickness t1 of the first scintillator layer 12 and the thickness t2 of the second scintillator layer 14 may be adjusted according to the design requirements of the products and/or the characteristic of the chosen scintillator materials. The present invention is not limited to the specific embodiments. It is understood that in other embodiments, the thickness t1 of the first scintillator layer 12 and the thickness t2 of the second scintillator layer 14 may be the same.

According to the embodiment of the invention, the aforesaid scintillator or scintillator material is capable of absorbing X-rays or other electromagnetic radiation (e.g., gamma rays, UV light, visible light, infrared, etc.) and emits visible light. For example, the first scintillator layer 12 and the second scintillator layer may comprise cerium-doped lanthanum bromide ($LaBr_3$: Ce), cerium-doped lanthanum potassium iodide ($K_2LaI_5$: Ce), barium fluoride ($BaF_2$), bismuth germanium oxide ($Bi_4Ge_3O_{12}$), lead tungstate ($PbWO_4$), cadmium tungstate ($CdWO_4$), cerium-doped yttrium aluminate ($YAlO_3$: Ce), cerium-doped lutetium aluminate ($LuAlO_3$: Ce), cerium-doped yttrium aluminum garnet fluorescent powder ($Y_3Al_5O_{12}$: Ce), cerium-doped lutetium aluminum garnet fluorescent powder ($Lu_3Al_5O_{12}$: Ce), cerium-doped gadolinium silicate ($CdSiO_5$: Ce), cerium-doped lutetium silicate ($LuSiO_5$: Ce), or any combination thereof. It is to be understood that the present invention is not limited to the above-described scintillator materials. For example, in other embodiments, the first scintillator layer 12 and the second scintillator layer 14 may comprise thallium-doped cesium iodide (CsI: Tl) or thallium doped sodium iodide (NaI: Tl).

According to the embodiment of the invention, the first scintillator layer 12 and the second scintillator layer 14 may be composed of the same material. However, in other embodiments, the first scintillator layer 12 and the second scintillator layer 14 may be composed of different materials. Further, two or more different scintillator may be buried or embedded in the front side or back side of the substrate 10.

Figure 3:
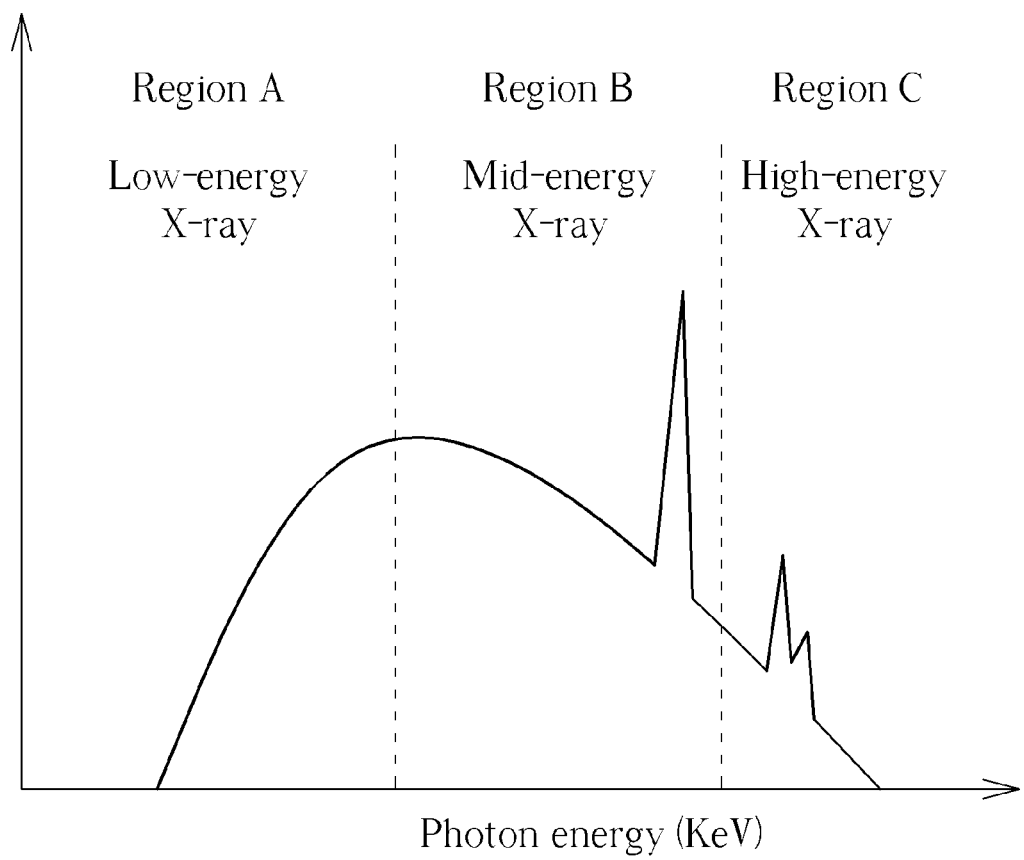
FIG. 3 shows the X-ray energy spectrum corresponding to the regions A, B, C of the scintillator panel.

FIG. 3 shows the X-ray energy spectrum corresponding to the regions A, B, C of the scintillator panel 1. As shown in FIG. 3, since the regions A, B, C of the scintillator panel 1 have different scintillator materials or thicknesses of scintillator, therefore the regions A, B, C correspond to the attenuated energy spectrum after the energies of different wavelength bands generated from the X-ray tube (or other excitation light source) passing through an object or human body, and thus so produce characteristic images of different spectral bands of X-ray energy, such that all energy levels of X-ray have the highest conversion efficiency.

The present invention scintillator panel 1 is designed to distinguish different energy levels of the X-ray. Human and animal organizations have different absorption rates for different X-ray bands, so the present invention scintillator panel 1 can effectively and clearly distinguish the gray-scale imaging in different organizations, to help physicians improve the accuracy of diagnosis.

Furthermore, the present invention scintillator panel 1 can effectively utilize each light energy level in the X-ray, so it can reduce the X-ray dose, thereby reducing the potential radiation damage to the human or animal. According to the embodiment of the present invention, as shown in FIG. 3, regions A, B, C may correspond to the X-ray of low energy, the X-ray of mid-energy, and the X-ray of high energy, and therefore, only one-time exposure to the irradiation, the low-, mid- and high-energy X-ray generated images may be obtained concurrently. Therefore, the present invention scintillator panel 1 can acquire the most image data with low radiation doses. In addition, when combined with different scintillator materials, the present invention scintillator panel 1 may provide the effect of color imaging.

FIGS. 4 and 5 show an exemplary method of making the scintillator panel according to one embodiment of the invention. First, as shown in FIG. 4, a transparent substrate 10 is prepared. On the front side 10a and the back side 10b of the substrate 10, a specific layout pattern of the trench 102 and a specific layout pattern of the trench 104 are formed respectively. According to the embodiment of the invention, the aforesaid specific layout pattern may be one shown in FIGS. 1A and 1B, but is not limited thereto. The trench 102 on the front surface 10a of the substrate 10 has a depth d1 and the trench 104 on the back surface 10b of the substrate 10 has a depth d2.

The method for forming the trench 102 and the trench 104 in the substrate 10 may include, but not limited to, injection molding, die-casting, micro-drill, laser, etching, sandblasting and drilling, etc., which can achieve a precision level with a pixel size of 20 to 200 microns. Next, as shown in FIG. 5, the trench 102 on the front side 10a of the substrate 10 is filled with a first scintillator layer 12, and the trench 104 on the back side 10b of the substrate 10 is filled with a second scintillator layer 14. The substrate 10 is then subjected to a planarization process, thus the present invention scintillator panel 1 is completed. According to one embodiment of the present invention, the scintillator can be powder, gel or paste form to fill, but is not limited thereto. Since the thickness of the first scintillator layer 12 and the thickness of the second scintillator layer 14 are determined by the depth of the trench 102 and the depth of the trench 104 respectively, so that crystal growth capability is not a limiting factor.

Figure 6:
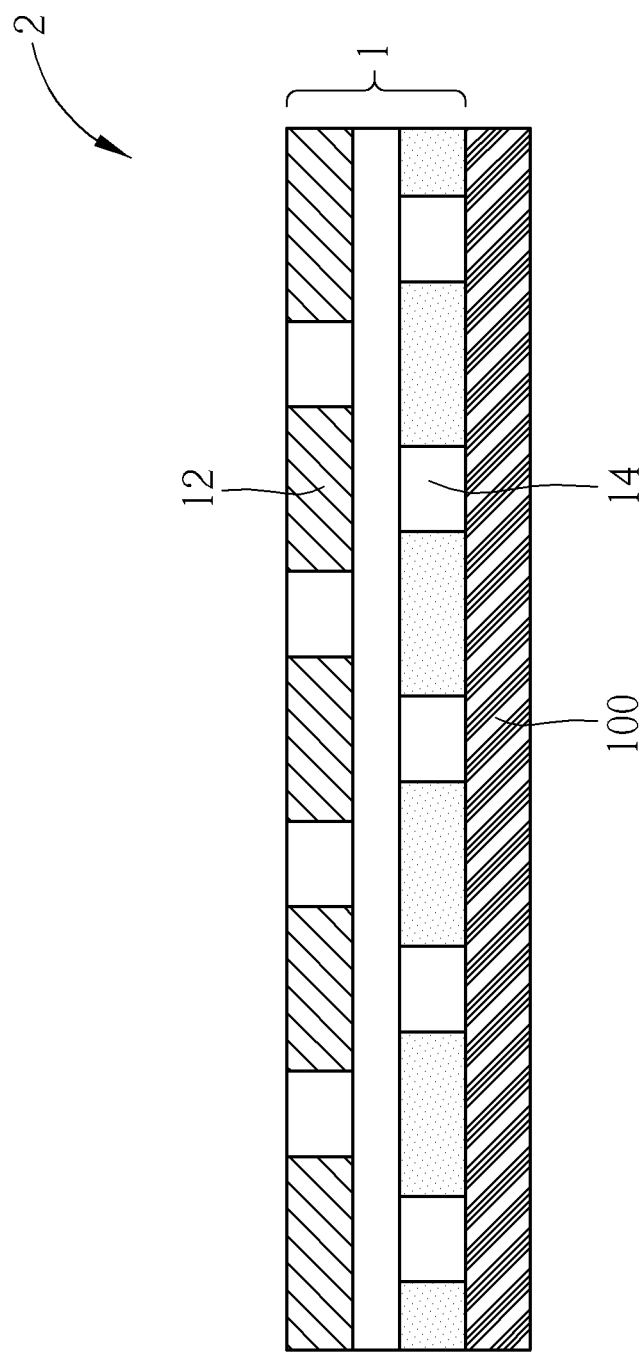
FIG. 6 is a cross-sectional view of a radiation imaging apparatus.

FIG. 6 is a cross-sectional view of a radiation imaging apparatus. As shown in FIG. 6, the scintillator panel 1 in FIG. 5 is coupled to an image sensor 100 to obtain the radiation imaging apparatus 2. In this figure, the image sensor 100 is incorporated on the back side of the scintillator panel 1, however, in other embodiments, the image sensor 100 may be coupled to the front side of the scintillator panel 1. According to the present embodiment of the invention, the image sensor 100 may be a thin film transistor (TFT) with P type-intrinsic-N type (PIN) diode, a charge-coupling diode (CCD), or a CMOS image sensor, but is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scintillator panel, comprising:
a substrate having a front side and a back side;
a first scintillator layer embedded in the front side of the substrate to a first depth; and
a second scintillator layer embedded in the back side of the substrate to a second depth.

2. The scintillator panel according to claim 1, wherein the substrate is a visible-light transparent substrate.

3. The scintillator panel according to claim 2, wherein the visible-light transparent substrate comprises a polymeric substrate, a plastic substrate, a glass substrates, a quartz or a quartz glass.

4. The scintillator panel according to claim 3, wherein the polymeric substrate comprises polyimide (PI), polyethylene terephthalate (PET), polycarbonate (PC), polystyrene (PS), or polymethyl methacrylate (PMMA).

5. The scintillator panel according to claim 1, wherein the first scintillator layer is not in direct contact with the second scintillator layer.

6. The scintillator panel according to claim 1, wherein the first scintillator layer comprises cerium-doped lanthanum bromide ($LaBr_3$: Ce), cerium-doped lanthanum potassium iodide ($K_2LaI_5$: Ce), barium fluoride ($BaF_2$), bismuth germanium oxide ($Bi_4Ge_3O_{12}$), lead tungstate ($PbWO_4$), cadmium tungstate ($CdWO_4$), cerium-doped yttrium aluminate ($YAlO_3$: Ce), cerium-doped lutetium aluminate ($LuAlO_3$: Ce), cerium-doped yttrium aluminum garnet fluorescent powder ($Y_3Al_5O_{12}$: Ce), cerium-doped lutetium aluminum garnet fluorescent powder ($Lu_3Al_5O_{12}$: Ce), cerium-doped gadolinium silicate ($CdSiO_5$: Ce), cerium-doped lutetium silicate ($LuSiO_5$: Ce), or any combination thereof.

7. The scintillator panel according to claim 1, wherein the second scintillator layer comprises cerium-doped lanthanum bromide ($LaBr_3$: Ce), cerium-doped lanthanum potassium iodide ($K_2LaI_5$: Ce), barium fluoride ($BaF_2$), bismuth germanium oxide ($Bi_4Ge_3O_{12}$), lead tungstate ($PbWO_4$, cadmium tungstate ($CdWO_4$), cerium-doped yttrium aluminate ($YAlO_3$: Ce), cerium-doped lutetium aluminate ($LuAlO_3$: Ce), cerium-doped yttrium aluminum garnet fluorescent powder ($Y_3Al_5O_{12}$: Ce), cerium-doped lutetium aluminum garnet fluorescent powder ($Lu_3Al_5O_{12}$: Ce), cerium-doped gadolinium silicate ($CdSiO_5$: Ce), cerium-doped lutetium silicate ($LuSiO_5$: Ce), or any combination thereof.

8. The scintillator panel according to claim 1, wherein the first scintillator layer and the second scintillator layer are made of the same material.

9. The scintillator panel according to claim 1, wherein the first scintillator layer and the second scintillator layer are made of different materials.

10. The scintillator panel according to claim 1, wherein the first depth is different from the second depth.

11. A radiation imaging apparatus, comprising:
a scintillator panel according to claim 1; and
an image sensor coupled to the scintillator panel.

12. The radiation imaging apparatus according to claim 11, wherein the image sensor comprises a thin film transistor (TFT) with P type-intrinsic-N type (PIN) diode, a charge-coupling diode (CCD), or a CMOS image sensor.

* * * * *